Nov. 16, 1954  F. J. KUNZ  2,694,597
VEHICLE TRANSPORTING DEVICE
Filed Oct. 2, 1950  4 Sheets-Sheet 2
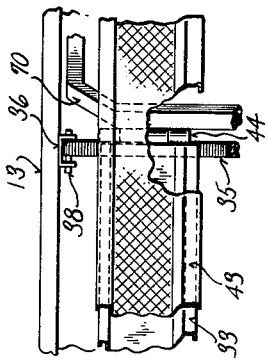
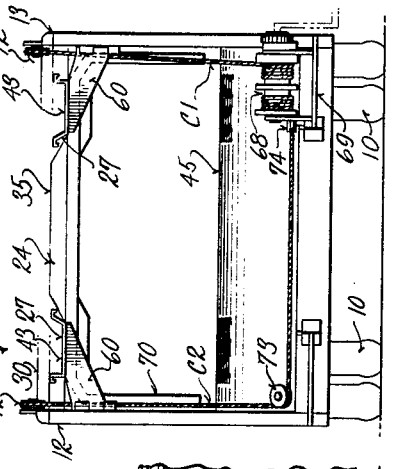
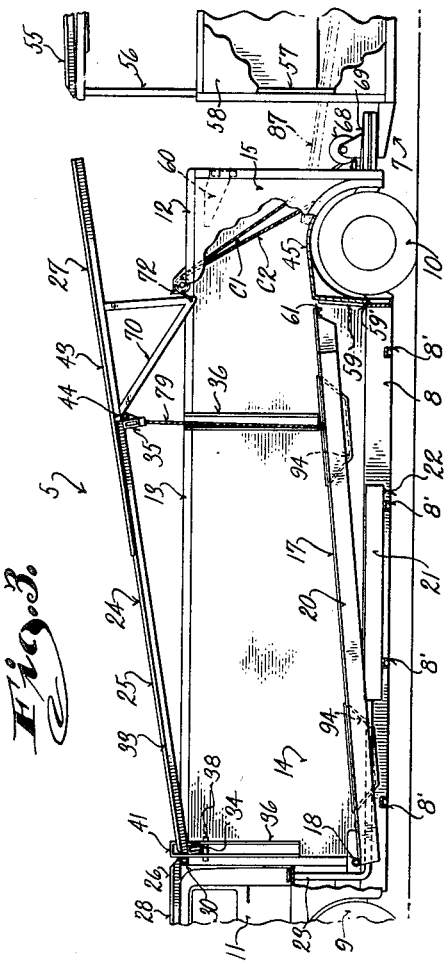
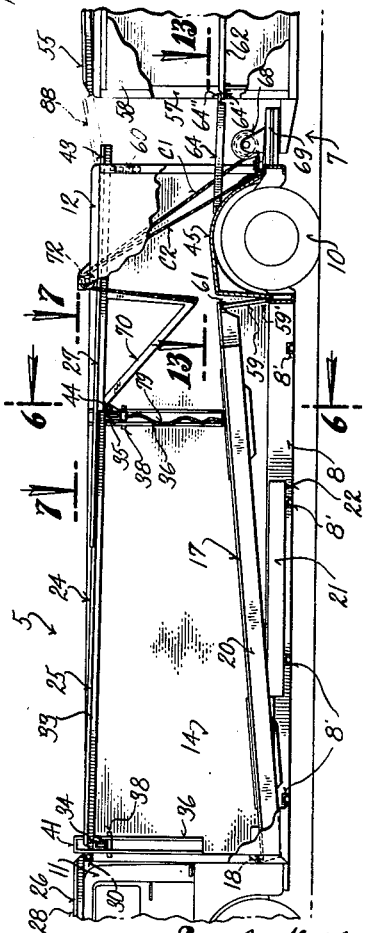
Inventor
Frederick J. Kunz Nov. 16, 1954   F. J. KUNZ   2,694,597
VEHICLE TRANSPORTING DEVICE
Filed Oct. 2, 1950   4 Sheets-Sheet 3
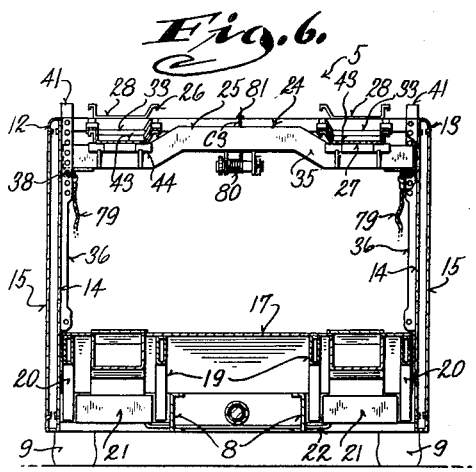
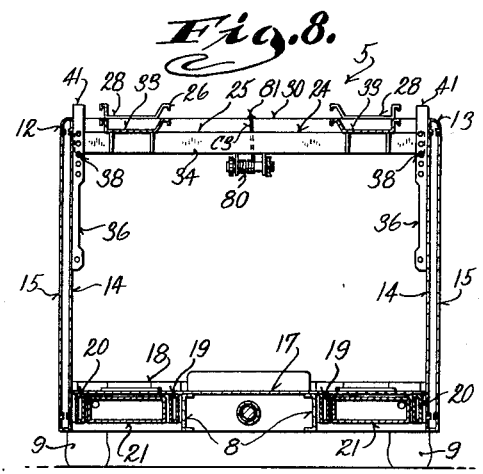
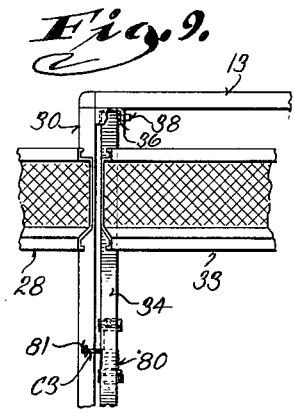
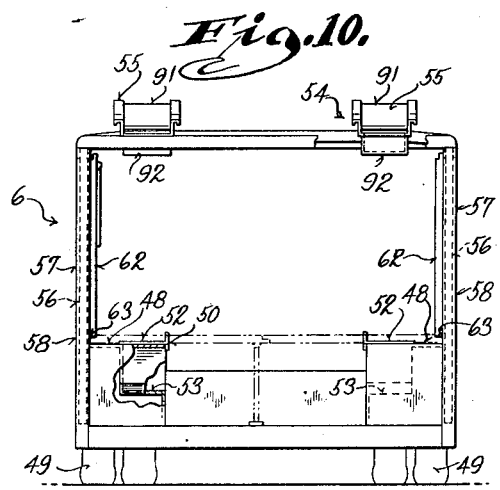
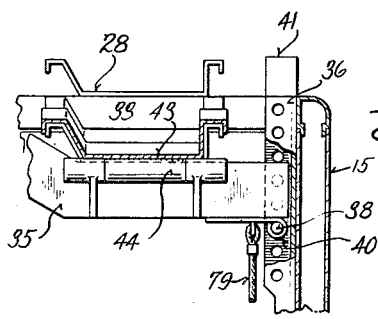
Inventor
Frederick J. Kunz Nov. 16, 1954  F. J. KUNZ  2,694,597
VEHICLE TRANSPORTING DEVICE
Filed Oct. 2, 1950  4 Sheets-Sheet 4
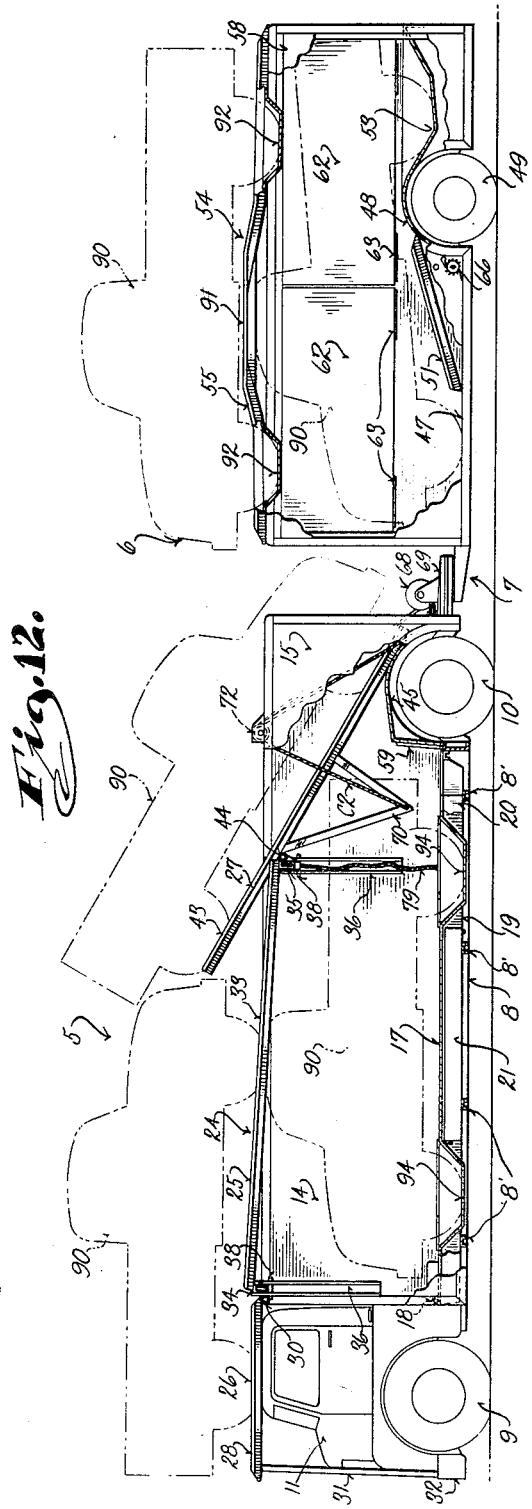
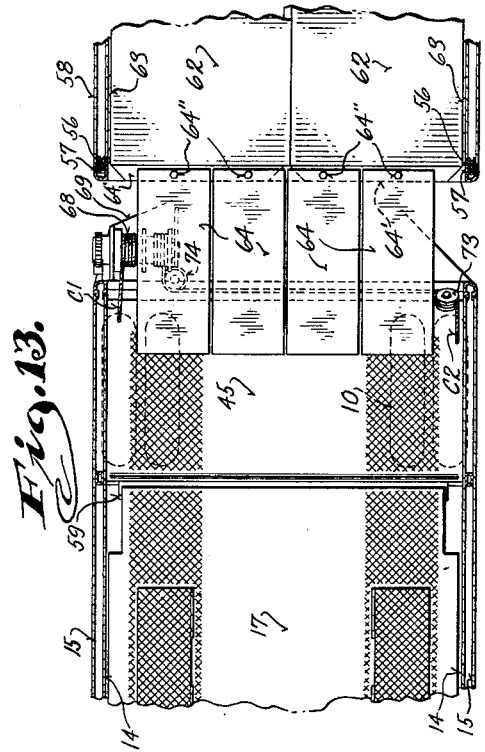
Frederick J. Kunz

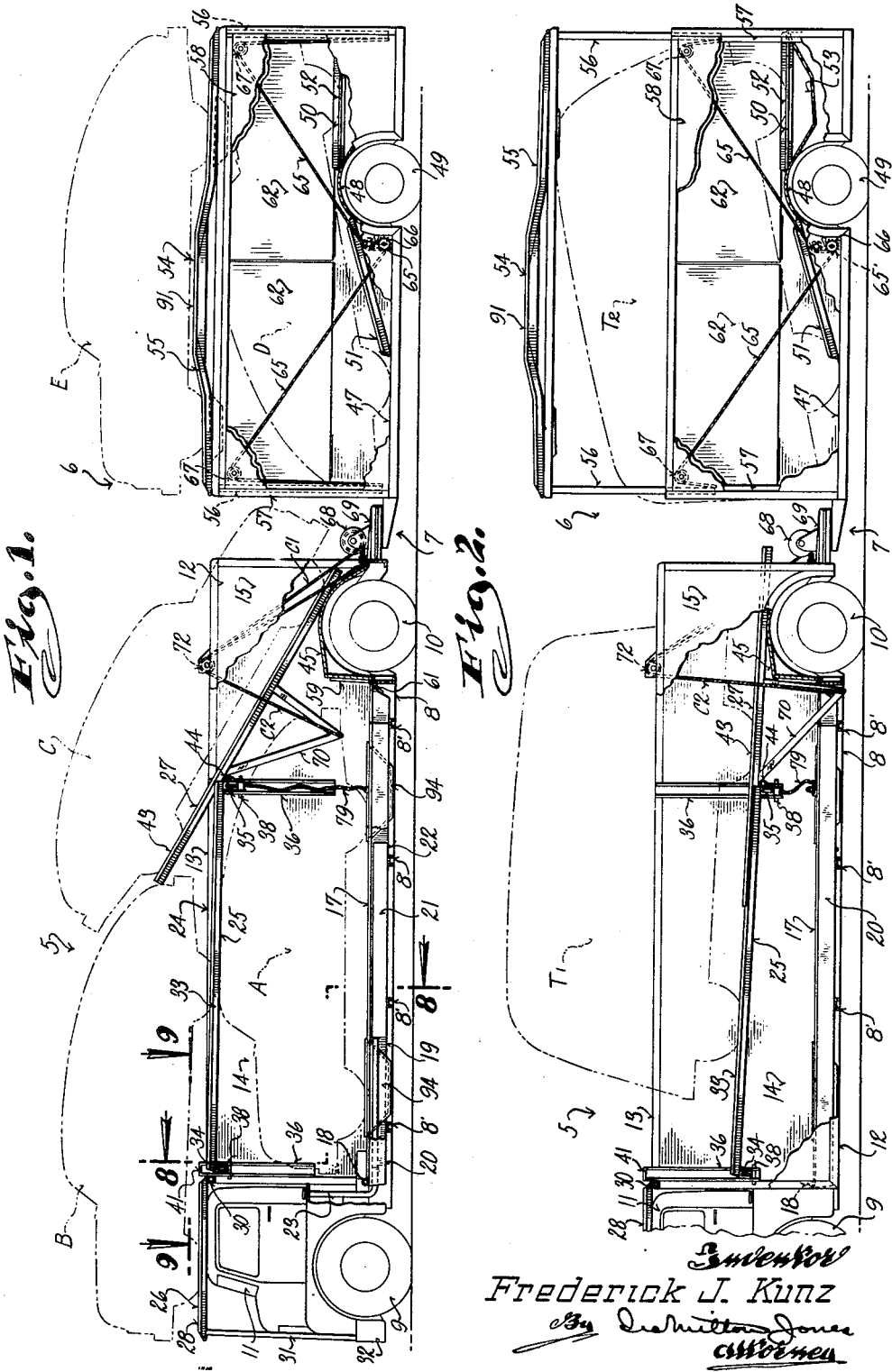

United States Patent Office 2,694,597
Patented Nov. 16, 1954

2,694,597

VEHICLE TRANSPORTING DEVICE

Frederick J. Kunz, Fort Jennings, Ohio, assignor to Car Carrier Equipment Company, Chicago, Ill., a corporation of Illinois Application October 2, 1950, Serial No. 187,907

4 Claims. (Cl. 296—1)

This invention relates to articulated road vehicles for transporting automobiles, and refers more particularly to semi-trailer automobile transport units of the type comprising a truck and a trailer partly supported and drawn by the truck.

Truck-trailer combinations of this type, when loaded, must not exceed the length, height and width limitations prescribed by various States. In order to enable operation of such transport devices in the largest number of States, it is common practice to limit their size so that they do not exceed 45 feet in length, 12½ to 13½ feet in height and 8 feet in width.

Until recently the only available transport units meeting these limitations were those incapable of transporting more than four full size automobiles. In some transport units all four automobiles were carried on a trailer drawn by a tractor carrying no automobiles; while in others two automobiles were carried on the truck and two on the trailer.

The present invention concerns five car transport units made possible by the use of trucks such as those shown and described in the Garnett Patents Nos. Re. 23,187 and 2,451,284, issued January 10, 1950 and October 12, 1948, respectively. These trucks are of the cab-over-engine type and are provided with automobile supporting decks enabling three automobiles to be carried by the truck within the 12½ to 13½ foot height limitation, and within an overall length no greater than the 45 foot length limitation for truck-trailer combinations minus the length of one full size automobile, so as to enable an additional two automobiles to be carried by a trailer close coupled to the truck.

Despite the fact that present five car transports of the type described are a big improvement over the conventional four car transporting units, they nevertheless have one disadvantage. Even though they are able to carry an additional automobile from the manufacturer to all areas of the country, they invariably had to be returned to their starting points empty, without a pay load.

With this objection in mind it is the main purpose of this invention to provide an improved articulated vehicle transporting device of the truck-trailer type which is not only capable of transporting five full size automobiles, three on the truck and two on the trailer without exceeding the commonly accepted length, height and width limitations, but to adapt the transporting device for either the carrying of freight on return hauls or for the transportation of truck-type vehicles larger than automobiles. The International "Metro," a panel truck commonly known as a stand-up truck is one of the types of vehicles that can be hauled advantageously on return trips. These trucks measure about 202 inches in length and 98 inches in height, and are made in the East where a relatively large percentage of automobiles are delivered by truck-trailer transports.

More specifically, it is a purpose of this invention to provide an improved truck-trailer transport unit with automobile supporting structure thereon capable of accommodating three cars on the truck and two automobiles on the trailer, which automobile supporting structure is capable of being repositioned on the truck and on the trailer to enable each to carry one stand-up truck thereon during return hauls.

Another purpose of this invention is to provide a five car transport unit of the character described with means to facilitate the transportation of ordinary freight on return trips.

With these and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side elevational view of the articulated transport device of this invention, with portions of the sides thereof broken away, and showing five full size automobiles supported for transit thereon;

Figure 2 is a view similar to Figure 1 but showing the deck structures repositioned and arranged for the support of two stand-up trucks;

Figures 3 and 4 are views similar to Figures 1 and 2, but illustrate the manner in which the deck structures are shifted to accomplish loading of the unit;

Figure 5 is an enlarged rear end view of the truck section of the articulated vehicle shown in Figure 4;

Figure 6 is a cross sectional view (through the truck section) taken through Figure 4 along the plane of the line 6—6;

Figure 7 is an enlarged fragmentary plan view illustrating details of construction, and taken along the line 7—7 of Figure 4;

Figure 8 is a cross sectional view through the truck section of the unit, taken along the line 8—8 of Figure 1;

Figure 9 is an enlarged fragmentary plan view taken along the line 9—9 of Figure 1;

Figure 10 is a rear view of the trailer section of the unit seen in Figure 1;

Figure 11 is an enlargement of a portion of Figure 6;

Figure 12 is a side elevational view similar to Figure 1 showing the deck structures arranged to support five pickup type trucks for transit on the unit; and Figure 13 is a fragmentary view taken along the line 13—13 of Figure 4 and showing the temporary bridging means employed to connect the freight carrying false floor of the trailer with the floor in the bottom of the truck.

Referring now particularly to the accompanying drawings, in which like numerals indicate like parts throughout the several views, the articulated transport device of this invention comprises a truck section 5 and a semi-trailer section 6 shorter than the truck section and close coupled thereto as by means of a hitch generally designated 7. The truck 5 is of the type shown and described in the Garnett Patents Nos. Re. 23,187 and 2,451,284 issued January 10, 1950, and October 12, 1948, respectively, in that it is designed to carry three automobiles designated A, B and C without exceeding the commonly accepted height limitation of 12½ to 13½ feet; and has a length to enable two additional automobiles designated D and E to be carried on the trailer, one over the other, without exceeding the 45 foot overall length limitation.

As in the aforementioned Garnett patents the truck 5 has a chassis which includes a pair of elongated opposing channels 8 extending longitudinally of the truck for substantially its entire length and spaced apart a distance slightly less than the tread of a full size automobile. The chassis is supported by front and rear wheels 9 and 10, respectively, at the extremities of the truck; and has a cab 11 and engine (not shown) at the front extremity of the truck over the front wheels 9 thereof. The usual opposite longitudinal side frames 12 and 13 are carried by the chassis a distance outwardly of its channels 8, and extend upwardly from the chassis to define the main body portion of the truck between them. At their rear, the side frames extend over the rear wheels 10 so that the truck body has a rear portion extending over the rear wheels while the main portion of the body lies between the front and rear wheels 9 and 10, respectively.

The side frames 12 and 13 each comprise a suitable structural framework, diagonally braced (not shown); and inner and outer panels 14 and 15 cover and conceal this framework to give a streamlined appearance to the truck. For convenience this paneling has been almost entirely broken away in Figures 1–4 inclusive.

The body is provided with a flat bottom wall 17 normally horizontally disposed at a level adjacent to the axes of the truck wheels, as shown best in Figures 1 and 4. The bottom wall 17 provides a floor extending the full width of the body and running rearwardly from the back of the cab 11 to terminate just short of the rear wheels 10; and is adapted to support the automobile A directly thereon lengthwise of the truck and in the space between the front and rear wheels 9 and 10 as close as possible to the back of the cab 11.

In its horizontal automobile supporting position shown in Figure 1, the bottom wall 17 rests flatwise upon the top flanges of the chassis channels 8 (see Figures 6 and 8), but at its forward end it is pivotally connected as at 18 to the body to enable tilting of the bottom wall upwardly off of the channels 8 about a transverse horizontal axis for a purpose to be explained later.

The bottom wall or floor 17 is reinforced by pairs of inner and outer longitudinally extending beams 19 and 20 fixed to its underside and resting upon transverse braces 8' extending horizontally between each channel 8 and the bottom rail of the adjacent side frame. The beams 19 are spaced to lie directly adjacent to the outer sides of the chassis channels 8, and the beams 20 lie close to the inside of the side frames of the body.

Thus, space is provided between the beams 19 and 20 at each side of the chassis channels for a gasoline tank 21. These tanks are preferably communicated with one another by a levelling pipe 22, and each has a filler pipe 23 accessible at the adjacent side of the truck, preferably near the door of the cab 11. Hence, the tanks 21 can be filled simultaneously from a single gasoline pump, it being understood that one of the pump hoses will be run through the cab 11 to the opposite pipe 23.

This disposition of the gasoline tanks is one of the novel features of this invention. It materially lowers the center of gravity, and because the tanks are spaced a distance rearwardly of the cab 11 causes the weight of the gasoline to be distributed substantially equally between the front and rear wheels 9 and 10 of the truck. In the past, it was customary to locate a single large gasoline tank at the back of the cab near the top thereof, so that nearly all of the weight of the tank and the gasoline therein was borne by the front wheels, and there was danger of seriously overloading the front axle of the truck.

From the description thus far it will be apparent that one full size automobile A, shown in construction lines in Figure 1, is adapted to be supported at a low level on the truck, between the front and rear wheels thereof.

The truck is also provided with an upper deck structure 24 which is comprised of intermediate and front and rear deck sections 25, 26 and 27, respectively. The front deck section 26 comprises a pair of laterally spaced channels 28 forming tracks to receive the front wheels of the automobile B; and this deck section is relatively short in that it extends only from the extreme front of the truck rearwardly to the back of the cab 11, or to a point approximately over the pivot 18 of the lower deck.

The front deck section 26 is rigidly supported in a fixed horizontal position, at the front of the truck directly over the cab 11, partly by connections with the top front crossbar 30 joining the side frames of the truck, and partly by front supports 31 which extend upwardly from the front bumper structure 32 to the underside of the deck 26 at the front thereof.

The intermediate deck section 25 is about twice the length of the front deck section 26 and likewise comprises a pair of channel shaped tracks 33 to receive the rear wheels of the automobile B. These tracks are held in spaced relationship by transverse beams 34 and 35 which are fixed to the underside of the tracks at their front and rear extremities respectively. These beams project laterally from the opposite sides of the intermediate deck section to have their ends received in channel shaped guides 36 fixed on the inner panels 14 of the side frames of the truck, and which guides extend vertically downwardly from points adjacent to the tops of the side frames.

By this construction it will be seen that the intermediate deck section 25 is mounted on the truck body for bodily up and down motion from a substantially horizontal automobile transporting position shown in Figure 1 to a lowered substantially horizontal truck transporting position shown in Figure 2. In the upper horizontal position shown in Figure 1, the intermediate deck section substantially aligns with the front deck section 26 to enable the automobile designated B to be jointly supported on the front and intermediate deck sections.

The intermediate deck section is adapted to be releasably held in its horizontal automobile transporting position by means of pins 38 passing through holes in the flanges of the four channel shaped guides 36. The front crossbeam of the intermediate deck structure rests on the tops of the front pins, while the rear pins 38 project through eyes 40 fixed on the underside of the projecting ends of the rear crossbeam 35 to anchor the rear of the intermediate deck section to the side frames.

In the automobile transporting position of the intermediate deck section, the front pins 38 hold the same at a level slightly beneath that of the front deck section 26, with the opposite ends of the beam 34 spaced a slight distance beneath the upper closed ends 41 of the front channel shaped guides 36. Hence, the intermediate deck section is releasably held at a predetermined elevation on the truck body, and in addition is capable of pivotal motion out of its horizontal automobile transporting position upon the front pins 38 when the rear pins are removed.

The purpose of the pivotal connection thus afforded by the front crossbeam 34 is to enable the intermediate deck section 25 to be swung out of its horizontal automobile transporting position shown in Figure 1 to an upwardly and rearwardly inclined loading position as shown in Figure 3, to facilitate loading of the automobile A on the lower deck of the truck; it being understood that the upper ends of the rear channel shaped guides 36 are open to allow the rear crossbeam 35 to pass upwardly out of its guides.

The rear deck section 27 also comprises a pair of channel shaped tracks 43 rigidly joined together in spaced apart relationship corresponding to the spacing of the tracks of the intermediate deck section, but these tracks are slightly smaller so as to be capable of nesting within the tracks of the intermediate deck section.

The rear deck section 27 is long enough to support the automobile designated C and has a pivotal connection 44 with the rear end of the intermediate deck section to enable it to be swung about a transverse axis intermediate its ends and adjacent to its underside from an automobile transporting position of relatively steep downward and rearward incline, as shown in Figure 1, into alignment with the intermediate deck section, as shown in Figure 4.

In its automobile transporting position the forward end of the rear deck section extends upwardly a distance beyond the adjacent rear end of the intermediate section to which it is pivotally connected, while its lower end extends downwardly and rearwardly to the rear extremity of the truck where it rests upon the rear wheel housing 45 inside the truck body.

Hence, the lower end of the rear deck section is supported by the rear wheel housing while the upper forward end portion of the rear deck section is supported by the intermediate deck section; and because of the fact the forward portion of the rear deck section extends a distance above the adjacent end of the intermediate deck section the automobile C supported on the rear deck section may overlap a substantial portion of the automobile B supported jointly on the front and intermediate deck sections. This accomplishes the degree of foreshortening necessary to hold the length of the truck to a figure no greater than the 45 foot length limitation minus the length of the trailer 6.

With this deck construction the positions of the automobiles on the truck are substantially identical to the positions of the automobiles on the trucks of the hereinbefore mentioned Garnett patents.

The automobiles D and E are supported in superimposed relationship on the trailer 6, which has a length substantially corresponding to the length of a full size automobile, so that the length of the entire articulated unit will not exceed the prescribed length of 45 feet.

The trailer 6 has a two part lower deck structure provided by a bottom wall or floor 47 forwardly of the wheel housing 48 for the trailer wheels 49 and at a level slightly beneath that of the floor 17 of the truck; and a rear deck section 50 behind the wheel housing 48 and lying horizontally at the level of the top of the wheel housing. Connecting the bottom or floor 47 with the rear deck section 50 is a ramp 51 mounted in an inclined position with its rear end resting upon the wheel housing 48 and its front end resting directly upon the bottom wall or floor of the trailer.

As stated, the rear deck section 50 is fixed in a horizontal position at the level of the top of the wheel housing 48, and comprises a pair of plates 52 detachably secured in position covering wells 53, the purpose of which will be later described. Referring to Figure 1 it will be noted that the wheels at the forward end of the automobile D rest directly upon the bottom of the trailer, while the wheels at the rearward end of the automobile rest on the rear deck section 50 of the trailer. This disposes the automobile D in a position of slight upward and rearward incline on the trailer at the lower level thereof.

The automobile E is supported on an upper deck 54 on the trailer which preferably comprises spaced channel shaped tracks 55 rigidly joined together in any suitable manner and having their ends secured to corner posts 56 at the four corners of the trailer. These posts are received in elongated vertical sockets 57 in the corners of the trailer and enable the upper deck to be raised and lowered with a bodily translating motion. In its lowered position, the upper deck is disposed substantially horizontally at the level of the front deck section 26 of the truck, but it is capable of being elevated a substantial distance as indicated in Figure 2.

It will be understood that the trailer likewise has upright panelled side frames 58 similar to those on the truck.

The transport unit described is particularly well suited for the transportation of five full size automobiles. In the past however, it has been customary to return these transport units empty after delivery had been made, thus wasting one entire trip.

According to the present invention, it is now possible to make use of the cargo space in such units on return hauls. Ordinary cargo can be loaded onto the transport truck after delivery of its five automobiles to enable the return trip to be made with a profit, merely by tilting the rear deck section 27 of the truck upwardly out of its Figure 1 position and into alignment with the intermediate deck section 25, with the forward end of the rear deck section nested in the rear end portion of the intermediate deck section.

The rear deck section may be releasably held in this position by means of brackets 60 hingedly mounted on the side frames of the truck, inside thereof, and near the rear extremity of the truck to engage under the channels 43 comprising the rear deck section. The brackets 60 may be locked in their positions shown in Figure 5 supporting the rear deck section in a horizontal position adjacent to the top of the side frames on the truck, or the rear deck section may be detachably secured to the brackets to maintain the rear deck section in its horizontal position providing access to the body space thereunderneath for loading and accommodation of freight. Hence it will be apparent that substantially the entire interior of the body can be made available for cargo hauling and such cargo can be protected merely by securing a tarpaulin over the top and rear end of the truck body.

While cargo may be supported for transit by the bottom wall or floor 17 while the floor is in its horizontal position on the truck, it is often advantageous to tilt the floor to the inclined position, seen in Figure 4, with its rear end at the level of the top of the rear wheel housing 45. The floor may be releasably supported in this tilted position by the engagement of the upper edge of an upstanding hinge plate 59 in a transverse channel 61 on the underside of the floor at the rear extremity thereof. The hinge plate has a pivotal connection as at 59' with the wheel housing at the lower front side thereof, and if desired, it may be flatwise releasably secured to the nearly upright front of the wheel housing when not in use.

This construction enables small forked cargo loading trucks commonly known as "mules" to be run into the truck from its rear (through the trailer) to facilitate loading of heavy freight into the truck. When freight is loaded in this manner, the intermediate and rear deck sections 25 and 27 are preferably swung upwardly to their inclined positions seen in Figure 3 to provide clearance for the "mules." It will also be appreciated that the truck body may have suitable doors in its sides to facilitate loading and unloading of freight.

Freight is also adapted to be loaded into the trailer, and to facilitate hauling cargo and the like the trailer is provided with platforms 62 normally detachably held in upright positions against the inner sides of its side frames. These platforms may be swung downwardly about fixed pivots 63, adjacent to their lower ends, into horizontal positions seen in Figures 4, 10 and 13, in which they are supported by legs on the platforms, to provide a continuous floor across the interior of the trailer at the level of the top of the wheel housings 45 and 48. There may be two or more such platforms 62 on each side of the trailer so that either front or rear platforms can be swung down to form a sectional false floor if desired.

This false floor also provides a supporting platform over which a "mule" may be run for loading freight onto the truck; and temporary bridging platforms 64 detachably connectable to the front edge of the trailer freight deck are used at such times to bridge the space between the trailer and truck. The connections between the platforms 64 and the freight deck of the trailer provided by the hinged platforms 62 when swung to their horizontal positions include apertured tongues 64' upon which the rear ends of the bridging platforms 64 are adapted to rest (see Figure 4). Bolts 64" thus can be passed through suitable holes in the rear of the bridging platforms and into the holes in the tongues 64' to detachably hold the bridging platforms in place with their front ends resting upon the rear wheel housing 45 of the truck.

Hence, the freight deck of the trailer, the bridging platforms 64, and the floor 17 of the truck when tilted as seen in Figure 4 provide a continuous floor over which a "mule" may be run to the extreme front of the truck body to facilitate loading freight thereinto.

Of great importance however is the fact both the truck and the trailer are designed to accommodate one stand-up type panel truck. Most of these trucks are made in the East, and their delivery to other parts of the country has always represented a problem from the standpoint of cost.

The manner in which two such stand-up trucks can be transported by the truck-trailer combination of this invention is best shown in Figure 2, where one of the trucks T₁ is supported jointly on the intermediate deck section 25 and the deck section 27 at a level a substantial distance beneath the automobile transporting position of the intermediate deck section of the truck.

To prepare the truck for the accommodation of such a stand-up truck, it is only necessary to remove the pins 38 from the flanges of the vertical guide channels 36 to allow the intermediate deck section 25 to be lowered substantially half way toward the bottom deck 17, in which position it may be releasably held by reinsertion of the pins 38 in other suitable holes in the flanges of the guide channels, as seen in Figures 6 and 8. Concomitantly with such lowering of the intermediate deck section the rear deck section 27 will be caused to tilt into alignment and nesting relationship with the intermediate deck section and will assume the position seen in Figure 2, to enable the stand-up truck T₁ to be supported jointly by the intermediate and rear deck sections substantially on a level with the rear wheel housing 45 of the truck, upon which the rearward end of the rear deck section rests.

Although these stand-up trucks have relatively great height, approximately 98 inches, the truck T₁ will be supported at a low enough elevation so as not to exceed the 12½ to 13½ foot height limitation prescribed by most States.

The second stand-up truck T₂ is carried by the trailer and is loaded thereinto at the lower level thereof. Clearance for the top of the truck T₂ is had by elevating the upper deck 54 of the trailer and securing it in its elevated position at a height substantially corresponding to the level of the top of the truck T₂. As is the case with the automobile D, the forward wheels of the truck T₂ are adapted to rest directly on the bottom of the trailer while the rear wheels of the truck are supported on the rear deck section of the trailer, with the truck in a slightly tilted position.

The loading of automobiles upon the truck 5 is nearly identical to the manner of loading the truck of the Garnett Patent No. 2,451,284 mentioned hereinbefore, and entails elevating the lower deck or floor 17 and the intermediate and rear decks 25 and 27 to their upwardly and rearwardly inclined positions shown in Figure 3 to enable the automobile A to be run into the back of the truck over the wheel housing 45 and onto the lower deck 17. Thereafter the lower deck structure and the intermediate and rear deck sections can be returned to their horizontal positions to enable the automobiles B and C to be loaded from the back of the truck with the automobile B resting jointly upon the front and intermediate deck sections.

The level of the intermediate and rear deck sections 25 and 27 may be slightly beneath that of the front deck section 26 for loading automobiles onto the upper deck of the truck without disrupting the continuity of the front and intermediate track sections. If desired, however, the front end of the intermediate deck section may be lifted up into exact alignment with the rear of the front deck section and releasably held so aligned by insertion of the front pins 38 in suitably located holes (see Figure 8) in the flanges of the front guide channels, so that there will be no vertical offset between the front and intermediate deck sections at the time the automobile B is loaded or unloaded.

The automobile C is loaded when the rear deck section 27 is in horizontal position substantially at the level of the top of the side frames of the truck, from the top deck of the trailer; after which the rear deck section 27 can be tilted to its downwardly and rearwardly inclined automobile transporting position shown in Figure 1.

The automobile A of course is driven through the trailer over its lower deck and into the back of the truck; the automobile D is driven directly into the back of the trailer onto its lower deck; and all of the other automobiles are loaded from the back of the trailer over the upper deck thereof, which, however, must be elevated as indicated in Figure 3 for the loading of the lower deck automobile on the truck and the trailer.

The upper deck 54 of the trailer is adapted to be readily raised and lowered by means of cables 65 joined to the lower ends of the corner posts 56 and trained over pulleys 67 mounted on the side frames adjacent to each end of the trailer at the top thereof, and located in the space between the panels of the side frames. These cables converge downwardly toward and wrap around a drum 65' which is adapted to be rotated by a crank manually manipulated from the exterior of the trailer. A pawl and ratchet arrangement 66 employed with the drum is used to enable the upper deck of the trailer to be held in any desired elevation or to be lowered at will.

The intermediate and rear deck sections of the truck are also adapted to be raised and lowered by cables wound over front and rear drums. The rear drum 68 is mounted on the hitch member 69 at the rear extremity of the truck behind the rear wheels at the right side of the truck, as seen in Figures 1 and 5. This drum is also manipulated by a crank and has a pawl and ratchet arrangement similar to that for the drum on the trailer.

The drum 68 is connected by cables C1 and C2 with the rear deck section 27 to accomplish lifting and tilting of both the intermediate and rear deck sections. For this purpose the rear deck section 27 has a triangular frame 70 fixed thereto at each side of the deck section and these triangular frames extend downwardly directly adjacent to the inner sides of the side frames of the truck body. At its lower end, or apex, each frame 70 has one of the cables (C1–C2) attached thereto, and each cable extends upwardly to be trained over a pulley 72 mounted on each side frame of the body at the top thereof substantially over the rear wheels 10 of the truck.

On the right hand side of the truck (see Figure 5) the cable C1 extends downwardly and rearwardly to wrap around the drum 68.

The cable C2 at the left side of the truck likewise extends downwardly and rearwardly from its pulley 72 and is trained over another pulley 73 at the rear of the truck so as to run across the back of the truck toward the drum 68 at the right side of the truck. The right hand end of cable C2 then is directed onto the drum 68 over another pulley 74 just ahead of the drum.

Assuming the deck sections to be in their positions shown in Figure 1, the drum 68 may be turned by a crank to cause the rear deck section 27 to be tilted in a counter-clockwise direction about its pivots 44 and to effect tilting of both the intermediate and rear deck sections, to their Figure 3 position, about the front beam 34 after the forward extremity of the rear deck section has nested within the adjacent end portion of the intermediate deck section.

Cable connections 79 between the rear end portions of the intermediate deck section and the lower deck or floor 17 are effective at the time the intermediate deck section is swung upwardly out of its horizontal automobile transporting position to tilt the floor 17 upwardly therewith and bring its rear end approximately to the level of the rear wheel housing 45 for loading of the automobile A onto the lower deck.

The front end of the intermediate deck section 25 is lowered and elevated independently by means of another crank operated drum 80 carried by the front cross-beam 34 of the intermediate deck section, and having a cable C3 wound thereover. The fixed end of this cable is anchored as at 81 to the transverse brace 30 connecting the side frames, and the cable C3 extends downwardly from the brace 30 to be wound directly onto the drum.

In loading either automobiles or stand-up trucks on the transport unit, it is customary to use temporary bridging track sections such as indicated at 87 and 88 in Figures 3 and 4 to facilitate the transfer of vehicles to be transported between the decks of the truck and trailer. The lower bridging track section 87, of course, may be used in place of the bridging platforms 64 when loading freight into the truck on "mules," and are long enough to bridge the space between the wheel housings of the truck and trailer. When so employed, the track section 87 rests on these wheel housings, and the trailer platforms are not used.

If desired, five pick-up trucks such as indicated at 90 in Figure 12 can also be carried on the articulated transporting device of this invention, three on the truck section substantially in the same positions as the automobiles A, B and C, and two on the trailer in superimposed positions.

The rear wheels of the lower truck on the trailer are received in the wells 53 behind the trailer wheels, and as stated hereinbefore, these wells are accessible upon removal of the rear deck plates 52. This is done to reduce the height of the lower pick-up truck on the trailer, and the upper deck 54 is preferably formed with an upwardly deformed intermediate portion 91 to assure clearance between the upper deck and the top of the cab on the truck therebeneath in the lowered position of the upper deck. The upper deck 54 is also provided with pairs of front and back wheel wells 92 in which the wheels of the upper pick-up truck are received for transit to reduce the overall height of the trailer. These wells 92 may be normally covered by detachable or hinged plates when transporting automobiles.

In order to reduce the height of the lower pick-up truck on the truck section 5 of the transport unit, the bottom deck structure or floor 17 also preferably has pairs of front and back wheel wells 94 to receive the front and back wheels of the pick-up truck supported thereby. These wells also may be normally covered by detachable or hinged plates, in a manner well known in the art, when transporting automobiles. Because of the greater height of the pick-up trucks, it is usually necessary to support the intermediate deck section 25 at a higher level than that of the front deck section 26. For this reason, the front channel guides have their closed ends 41 projecting a slight distance above the tops of the side frames of the truck, permitting the front cross beam 34 to be moved up to the tops of the guides. These beams, of course, are releasably held in this elevated position by inserting the front pins 38 in the topmost holes in the guide flanges (see Figure 8).

From the foregoing description, together with the accompanying drawings, it will be apparent that the articulated vehicle transporting device of this invention has unusual versatility to enable several different kinds of vehicles to be transported thereon, and to enable the device to carry a pay load on return trips after the delivery of five full size automobiles.

What I claim as my invention is:

1. An automobile transport device for transporting either three full size automobiles or one truck-type vehicle of greater height comprising: a chassis supported by front and rear wheels spaced apart a distance only slightly greater than the length of a full size automobile; upright side frames supported by said chassis; means mounted on the chassis defining a lower deck between said front and rear wheels to support a first automobile on the device, the front of said lower deck lying closely adjacent to the front wheels; means defining an upper automobile supporting deck and comprising intermediate, and front and rear end deck sections, the rear of the front end section and the front of the intermediate deck section being disposed substantially in vertical alignment with the front of the lower deck; cooperating means on the intermediate section and said side frames for detachably holding said intermediate section in either a substantially horizontal automobile transporting position spaced above the lower deck a distance to accommodate an automobile thereon, or in a lower substantially horizontal truck transporting position spaced directly beneath said first position and in the space normally occupied by an automobile on said lower deck; means for supporting the rear end deck section in a position aligning with and forming a continuation of said intermediate section in the lowered truck transporting position thereof so that a truck can be supported jointly upon said intermediate and rear end deck sections at a low elevation on the transport device; means for supporting said rear end deck section in an automobile transporting position on the device, inclined with respect to said intermediate section in said elevated position of the latter, with its end adjacent to the intermediate section extending a distance thereabove and with its opposite end extending downwardly over the rear wheels of the chassis; and means for holding the front end deck section in a substantially horizontal position over the front wheels of the chassis and substantially in line with and forming a forward continuation of said intermediate section when the latter is in its elevated automobile transporting position, so that an automobile can be supported jointly by said intermediate and front end deck sections when the latter are substantially aligned with one another.

2. In a transporting vehicle for carrying either three full size automobiles or one relatively high panel truck: means on the vehicle defining a lower deck to support one automobile at a lower level on the vehicle medially of its ends; means on the vehicle defining an upper deck to support two automobiles, said upper deck comprising intermediate and front and rear deck sections, the intermediate section having a length substantially twice that of the front section; means for releasably holding said intermediate deck section in a substantially horizontal automobile transporting position on the vehicle, medially of the ends thereof, at an elevation above the lower deck to accommodate an automobile thereon, and with the front end of the intermediate section substantially in vertical alignment with the front end of the lower deck; means for holding said front deck section on the vehicle in a substantially horizontal position substantially in line with said intermediate deck section so that one automobile can be carried jointly by said front and intermediate deck sections; means for releasably holding the rear deck section in an inclined automobile transporting position on the vehicle with one extremity thereof alongside but projecting above the adjacent end of the intermediate deck section and its opposite extremity extending downwardly away from said intermediate deck section, so that said rear deck section may carry an automobile with its elevated end overlapping the adjacent end of an automobile resting on the front and intermediate deck sections, and extending diagonally over the adjacent end portion of an automobile on the lower deck; means for releasably holding said intermediate deck section in a truck transporting position on the vehicle, a distance directly beneath its automobile transporting position, and in the space normally occupied by an automobile on the lower deck; and means for releasably holding said rear deck section in alignment with and forming a rearward continuation of said intermediate deck section in each of said transporting positions thereof, to enable a panel truck to be carried jointly by the intermediate and rear deck sections in the lowered position of said intermediate deck section, or to enable all of said upper deck sections to be disposed in substantially horizontal alignment at the level of the front deck section.

3. A vehicle transporting truck for carrying either three full size automobiles or one high-body truck, said transporting truck comprising: front and back wheels; a body including a driver's cab over the front wheels, said body including a main portion between the front and back wheels with a floor in its bottom at a low level adjacent to the level of the wheel axes for supporting an automobile in a substantially horizontal position, the forward end of the floor lying closely adjacent to the front wheels and to the back of the cab; an upper deck structure for the truck comprising intermediate, and front and rear deck sections; means mounting said front deck section in a substantially horizontal position over the driver's cab, entirely forwardly of said floor; means mounting said intermediate deck section on the main body portion of the truck for substantially translatory movement from an automobile transporting position substantially aligning horizontally with said front deck section and with its front end substantially in vertical alignment with the front end of said floor, to a lowered substantially horizontal position spaced a distance beneath its automobile transporting position; cooperating means on the body and said intermediate deck section for releasably holding the latter in either of said positions thereof; means for releasably holding said rear deck section in an automobile transporting position of relatively steep downward and rearward incline, with the lower end thereof adjacent to the rear wheels of the truck and the upper portion of said inclined rear deck section extending upwardly a distance above the rear of said intermediate deck section in the automobile transporting position thereof; and cooperating means on the body and said intermediate deck section for supporting said rear deck section in a position substantially aligning with and forming a rearward continuation of the intermediate deck section in the lowered position thereof to thus provide a low level support for a high-body truck extending continuously from the back of the driver's cab to the rear of the truck.

4. The vehicle transporting truck set forth in claim 3 wherein said intermediate deck section is provided with laterally extending portions, adjacent to its front and back ends, slidably received in vertically disposed guides on the truck body to guide the intermediate deck section for bodily up and down motion between its automobile and truck transporting positions.

References Cited in the file of this patent

UNITED STATES PATENTS

| Number | Name | Date |
|---|---|---|
| Re. 23,187 | Garnett | June 10, 1950 |
| 1,229,714 | Clark et al. | June 12, 1917 |
| 1,247,553 | Linquist et al. | Nov. 20, 1917 |
| 1,809,557 | Lishon | June 9, 1931 |
| 2,146,567 | Dondlinger | Feb. 7, 1939 |
| 2,432,228 | De Lano | Dec. 9, 1947 |
| 2,451,284 | Garnett | Oct. 12, 1948 |
| 2,492,829 | Baker | Dec. 27, 1949 |
| 2,492,980 | Garnett | Jan. 3, 1950 |